Feb. 13, 1962 R. J. WOHL 3,020,751
WIDE FREQUENCY RANGE ELECTROMECHANICAL VIBRATOR
Filed Aug. 29, 1956 6 Sheets-Sheet 1

Fig. 1

INVENTOR.
ROBERT J. WOHL
BY George Sipkin
Lee J. Huntzberger
ATTORNEYS

INVENTOR.
ROBERT J. WOHL
ATTORNEY

United States Patent Office 3,020,751
Patented Feb. 13, 1962

3,020,751
WIDE FREQUENCY RANGE ELECTRO-
MECHANICAL VIBRATOR
Robert J. Wohl, New York, N.Y.
(87—23B 217th St., Queens Village 27, N.Y.)
Filed Aug. 29, 1956, Ser. No. 606,934
6 Claims. (Cl. 73—71.6)
(Granted under Title 35, U.S. Code (1952), sec. 266)

The invention described herein may be manufactured and used by or for the Government of the United States of America for governmental purposes without the payment of any royalties thereon or therefor.

This invention relates to improved electromechanical vibrators of the kind known also as shakers, and more particularly to improved electromechanical vibrators that are capable of driving loads on the order of ounces, pounds, or several tons over substantially the entire audio frequency range and beyond at a high g factor.

The g factor is dimensionless, being the ratio of the peak acceleration produced by the vibrator divided by the acceleration due to the force of gravity, namely 32 feet per second per second. The magnitude of the g factor is directly proportional to the square of the frequency and is also directly proportional to the amplitude of vibration.

Vibrators have been used for a long time in the testing of small and large equipments at least during development thereof where the equipments are destined to be subjected to vibration in use. Mobile devices such as autos and planes are examples of larger equipments tested by vibrators; vacuum tubes are examples of small size equipments tested by vibrators. The mechanical vibration frequencies of interest correspond, generally speaking, to the audio frequency range, namely 20–20,000 cycles per second. However, none of the equipment testing vibrators that have been available to date operate satisfactorily over anywhere near as wide a frequency range; each of the many types of equipment testing vibrators available to date operate satisfactorily over only a small fraction of the audio frequency range.

Equipments are vibration tested with one parameter of the vibration generally kept constant regardless of frequency; sometimes g factor is kept constant, other times the peak velocity is kept constant or the displacement is kept constant; at very low frequencies it is most practical to keep the displacement constant. It has been recognized that in any particular equipment one of these parameters can have greater effect on the useful life than the others.

There are a variety of known types of electromechanical transducers, e.g., electric-to-hydraulic, electric-to-pneumatic, electrostrictive, magnetostrictive, electromagnetic, and electrostatic, from which vibrators can be constructed. In general, electromagnetic transducers are used in low frequency vibrators, while some of the others may be used in high frequency vibrators. The electromagnetic type is most practical for driving heavier loads through large excursions at lower frequencies; the other types are more practical for driving lighter loads through smaller excursions at higher frequencies.

Resonance is one factor that has limited the utility of the lower frequency vibrators. For example, even the most carefully designed electrodynamic vibrators for driving loads on the order of pounds develop resonances around 2000 cycles per second. Higher frequency vibrators have been available for driving loads at frequencies up to 10,000 cycles per second but they cannot drive the loads through sufficiently large excursions at frequencies below 1,000 cycles to keep the g factor constant, nor can they accommodate loads exceeding an ounce or so. Standing waves is another factor that has limited the utility of the lower frequency vibrators. When vibrational energy is imparted to an element such that the wavelength of the vibrational energy is equal to or not much different from a lineal dimension of the element standing waves are established in the element. To appreciate the detrimental effect of standing waves consider the equipment being tested as secured to the structure in which are set up standing waves. The entire equipment will not be vibrated in unison; various segments of the equipment will be out-of-phase with respect to each other being subjected to a complex bending action.

This invention includes, in combination, lower frequency vibrator elements and higher frequency vibrator elements. The higher frequency vibrator elements are superposed and secured on the lower frequency vibrator elements so that a load mounted on the former experiences the linear superposition of the two mechanical motions. A preferred form of this invention includes electromagnetic transducer means which are low impedance, comparatively high power, large excursion means as the lower frequency vibrator elements and electrostrictive transducer means which are high impedance, comparative low power, small excursion means as the higher frequency vibrator elements. The lower frequency vibrator elements include large mounting members allowing for large displacements at low frequencies and the higher frequency vibrator elements are small being called upon for small displacements only at the higher frequencies. With a constant amplitude exciting current, the plot of g factor versus frequency for the lower frequency vibrator elements (electromagnetic) is in accordance with that of electromagnetic vibrators presently available commercially. The plot is substantially flat from a fairly low frequency, peaking at some higher frequency and then dropping off rapidly. With a constant amplitude exciting voltage, the plot of peak displacement versus frequency for the higher frequency vibrator elements (e.g. electrostrictive) is flat; the peak velocity is directly proportional to frequency and the peak acceleration is directly proportional to the square of the frequency. By passing the exciting voltage for the higher frequency vibrator elements through two integrating circuits in cascade before application to the higher frequency vibrator elements, the plot of g factor against frequency for the higher frequency vibrator elements is rendered flat. Input circuits divide the exciting energy so that all that below the peaking frequency goes to the lower frequency vibrator elements and all that beyond the peaking frequency goes to the higher frequency vibrator elements and around the peaking frequency the energy is properly divided to provide a constant g factor over the combined frequency range. The dip in the response curve of the higher frequency vibrator elements at the crossover point is utilized to compensate for the upper end resonance of the low frequency driver; upper end resonance limits the useful range of vibrators available to date. The dip in the response curve is emphasized by resort to conventional design considerations so that when added to the resonant peak of the low frequency vibrator elements a uniform response is achieved.

It is important to note that acceleration is not only directly proportional to the square of the frequency but also is directly proportional to amplitude. Consequently, for constant acceleration (constant g) the displacement increases rapidly as the frequency decreases. The displacement of the higher frequency vibrator elements cannot exceed a permissible amount. This is another factor that controls the selection of the crossover frequency between the higher frequency and lower frequency vibrator elements during design. The minimum frequency at which the g can be kept constant is likewise determined by maximum permissible displacement of the lower frequency elements.

While the above discussion is concerned with constant g factor, constant velocity or constant displacement is obtainable in like manner utilizing the principles already discussed. Differentiating or integrating circuits are used to alter the signal input to the vibrator for keeping one of the abovementioned characteristics constant over a wide frequency range.

An object of this invention is to provide an improved wide frequency range electromechanical vibrator.

A further object of this invention is to provide an improved wide frequency range electromechanical vibrator that can drive light or heavy loads at a frequency anywhere in the range extending from about 20 cycles per second to about 20,000 cycles per second or above, all segments of the load being driven in phase.

A further object is to provide an improved wide frequency range electromechanical vibrator that can drive light or heavy loads at a frequency anywhere in the range extending from about 20 cycles per second to about 20,000 cycles per second or above, with a g factor that is substantially constant over the entire range.

A further object is to provide an improved wide frequency range electromechanical vibrator that can drive light or heavy loads at a frequency anywhere in the range extending from about 20 cycles per second to about 20,000 cycles per second, or above, with a displacement that is substantially constant over the entire range.

A further object is to provide an improved wide frequency range electromechanical vibrator that can drive light or heavy loads at a frequency anywhere in the range extending from about 20 cycles per second to about 20,000 cycles per second or above with a velocity that is substantially constant over the entire range.

A further object is to provide an improved wide frequency range electromechanical vibrator that can drive light or heavy loads with vibrational energy distributed over a frequency range extending from about 20 cycles per second to about 20,000 cycles per second or above, to approximate field conditions.

A further object is to provide a simple, inexpensive circuit for driving a wide frequency range vibrator with electrical impulses.

Other objects and many of the attendant advantages of this invention will be readily appreciated as the same becomes better understood by reference to the following detailed description when considered in connection with the accompanying drawings wherein:

Figure 1:
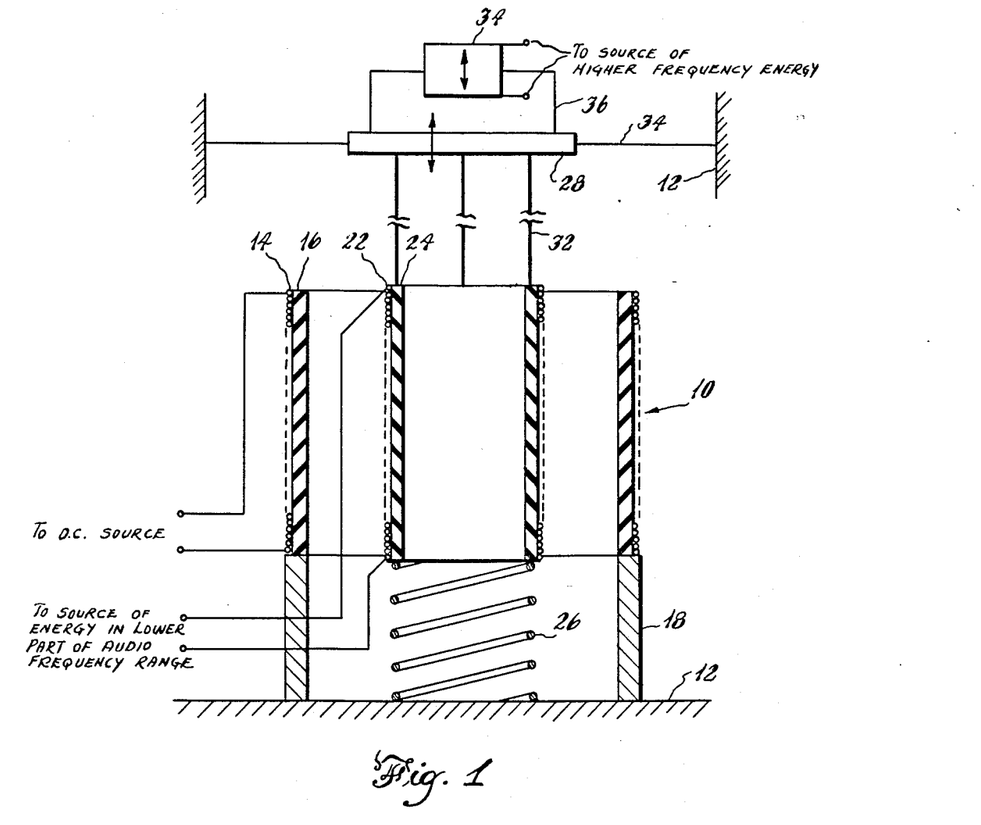
FIG. 1 shows a preferred embodiment of this invention including only the essential structure, part of which is shown diagrammatically in elevation and part of which is shown in section.

The vibrator 10 includes rigid support structure 12. A coil 14 arranged on a coil form 16 is adapted to be connected to and energized by a direct current source not shown. Coil 14 and form 16 are secured to the rigid support structure 12 by means of rigid elements 18. A second coil 22 arranged on a coil form 24 is adapted to be connected to and energized by an alternating current source (FIGS. 2–4) providing excitation energy at a frequency or frequencies in the lower part of the audio frequency range. Coil 22 and form 24 are supported on the rigid support structure by resilient means such as coil spring 26. Spring 26 need not necessarily be coil spring since radial cantilever flat springs, or other, can be used. Spring 26 applies a restoring force for axially positioning coil 22. If spring 26 is of cantilever form or other that applies a radial force component, spring 26 aids in keeping the coils 14 and 22 coaxial. A rigid table structure 28 is secured to the coil 22 and form 24 by rigid elements 32. Resilient suspending means 34 connects the table 28 to the rigid support structure 12. The prime function of the resilient suspending means 34 is to continuously align the axes of the coils 14 and 22; means 34 also applies an axial restoring force. Under some circumstance only one of springs 26 and 34 need be included in the combination. The electromechanical transducer structure described in this paragraph in general terms and illustrated diagrammatically in FIG. 1, is conventional. It is sold commercially in a variety of designs that are basically the same as described above and is frequently designated simply as a shaker. To some extent the variety of designs are no more than adaptations for accommodating particular size loads at particular frequency ranges with a particular relationship between amplitude of excursion and frequency.

Figure 6:
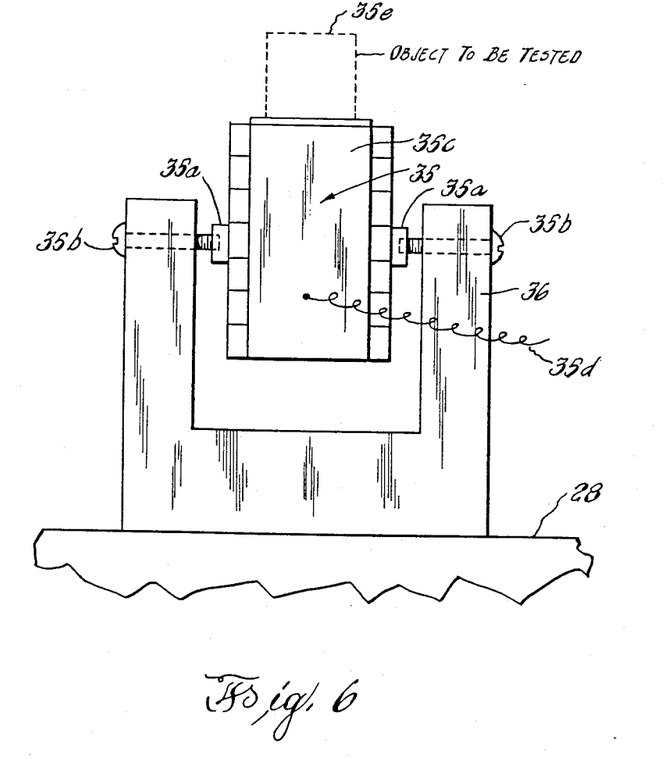
FIG. 6 is an elevation illustrating one manner of supporting a transducer stack upon the rigid table.
Figure 7:
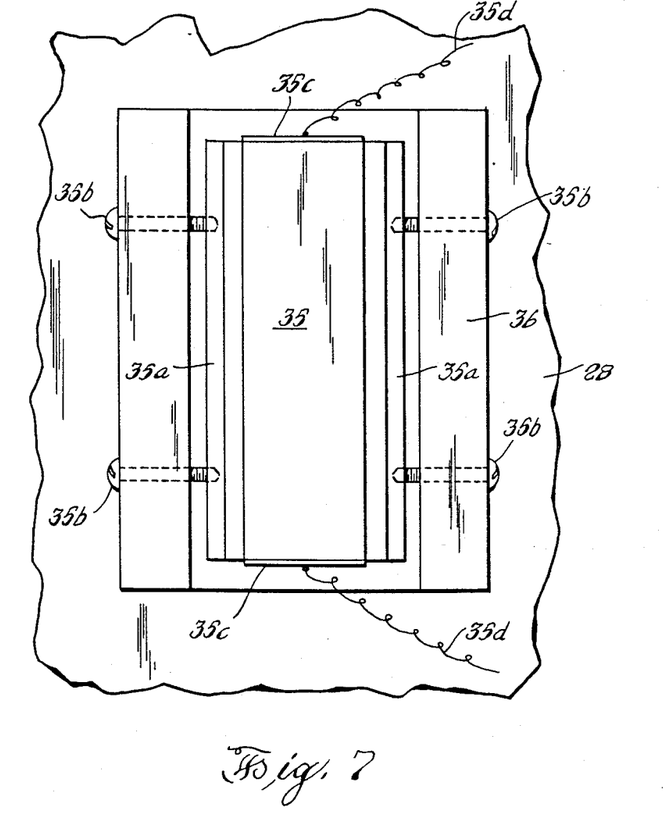
FIG. 7 is a plan of the same.

A higher frequency electromechanical transducer 35, shown in block form in FIG. 1, is secured to table structure 28 by means of rigid elements 36. The higher frequency electromechanical transducer may be any of the conventional types such as electrostrictive, magnetostrictive, electrostatic, or electromechanical. The power-transducing capabilities, amplitude of vibration, cost, accuracy, durability and other such considerations will determine the particular one selected. For purposes of simplicity and not in any limiting sense, this description is confined to the electrostrictive (or inverse piezoelectric) type, preferably in the form of a stack of barium titanate elements. Any suitable means may be employed for supporting the transducer 35 on rigid structure 36, but one way of doing so is illustrated for example in FIGS. 6 and 7. In FIGS. 6 and 7, the stack of barium titanate elements, the elements of which are cemented together face to face, carries at opposite sides two bars 35a which extend horizontally and are located about midway of the height of the stack so as to be substantially at the nodal line or area of the stack. Screws 35b pass through and are threaded in the rigid structure 36 and extend into the bars 35a to support the stack. The elements of the stack are connected together on opposite ends by plates 35c to each of which a circuit wire 35d is attached. An object to be tested is supported on the top of the stack as shown conventionally by the dash line 35e in FIG. 6. The nodal mounting is preferred. The barium titanate plates are advantageous in forming the stack because of its large electrostrictive coefficient wherein its mechanical output is relatively large for a given electrical input signal, and it is mechanically strong, so that it will sustain a large strain due to changes in dimensions before it will break, as compared to other possible substitute materials, thus permitting larger mechanical amplitudes of motion. When the stack of elements, of whatever material, is held or supported solely at the nodal area, that is where in its first vibratory mode no motion is engendered, higher modes of vibration are very effectively discouraged, since they would require motion of the heavy mass represented by the clamping structure and the table, drive coil, drive rods and other movable parts of the low frequency vibrator. Thus, fidelity with which electrical signals are transduced into mechanical motion is improved by a reduction of the harmonic distortion that might otherwise exist.

Figure 8:
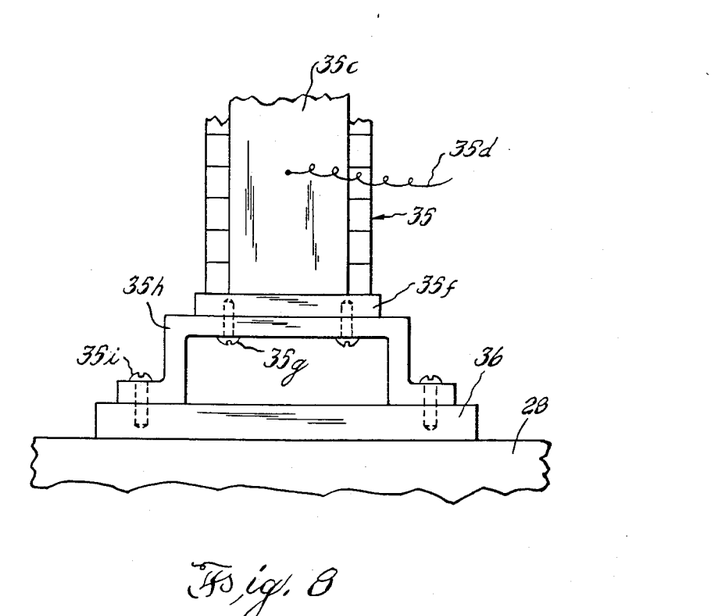
FIG. 8 is an elevation of another manner of supporting a transducer stack upon a rigid table.

In FIG. 8, another but direct manner of mounting the stack is illustrated, in which the stack rests upon and is cemented to a plate 35f and the latter anchored by screws 35g to a bracket 35h that is secured by screws 35i to the rigid structure 36. Because the rigid elements 36 engage the center of transducer stack 35 in FIGS. 1, 6 and 7 the higher frequency vibration energy is not transferred from the transducer stack 35 to the lower frequency electromechanical transducer elements 22, 24, 28, etc. and does not cause any resonance therein. However, this arrangement has a disadvantage. Because the center of the transducer stack 35 is engaged by the rigid elements 36, there is a sacrifice in the amplitude of excursion of a test specimen secured to the top of the transducer stack 35. The portion of the transducer stack between its engagement with the rigid elements 36 and the table structure 28 contributes nothing to the amplitude of excursion. Consequently where transfer of higher frequency energy from transducer stack 35 to the lower frequency transducer elements 22, 24, and 28, etc. is not as important as cost, compactness and like considerations, face to face direct mounting on the table structure 28 is substituted for the nodal mounting as shown in FIG. 8. Though only one higher frequency transducer 35 is shown mounted on the table structure 28 in FIG. 1, additional transducers 35 identical thereto may be mounted on the table structure. The number of higher frequency transducers 35 mounted on the table structure 28 is dictated by the size and weight of test load to be supported thereby. The number of elements in each of the higher frequency transducers is a direct function of the amplitude of excursion desired. If a plurality of transducers 35 are used they are oriented to define a common mounting plane for equipment to be tested.

The higher frequency vibrator elements could be any type of transducer means. Its design would be such as to require only small displacement so that even an electromagnetic type would be feasible.

To drive the vibrator 10, there is provided a direct current source, not shown, and an alternating source. The former is connected to the coil 14 and the latter is connected to coil 22. The latter (FIG. 2) includes electrical signal source 38. The electrical signal source 38 may provide steady-state sine wave energy, or swept frequency sine wave energy, or distributed noise otherwise known as white noise, or impulses whose energy is distributed over a wide frequency range, or may reproduce from a recording the shock and vibration at the site at which will be located the particular equipment being tested. The output of the electrical signal source 38 is coupled to an audio frequency power amplifier 42. The amplified signal is thence coupled by a suitable transformer 44 to frequency dividing network 46. The frequency dividing network is a conventional band dividing filter means. The filter means provides the crossover characteristic discussed earlier in the specification. The frequency dividing network separates the lower frequency energy and the higher frequency energy content of the signal and couples the respective energies to the lower frequency transducer elements and the higher frequency transducer elements of vibrator 10.

Figure 3:
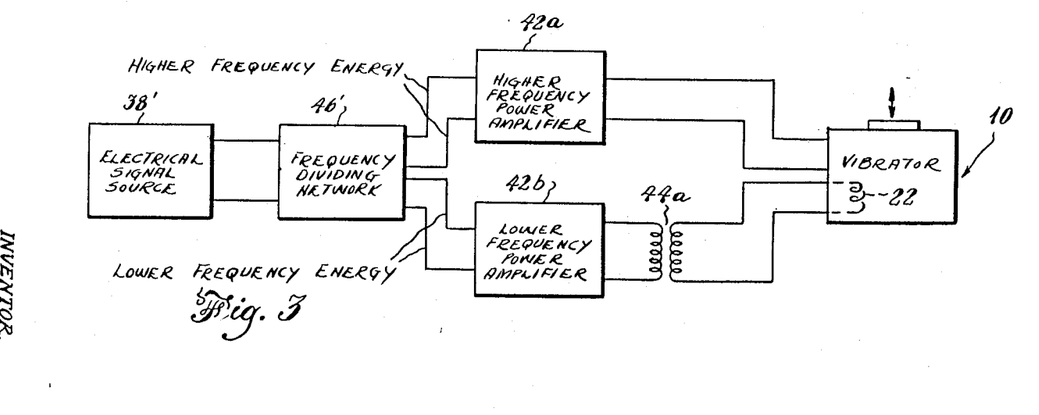
FIG. 3 shows a modification of FIG. 2.

In the modification shown in FIG. 3, the frequency dividing network 46' is connected directly to the electrical signal source 38'. The higher frequency portion of the signal energy is coupled into higher frequency power amplifier 42a and the lower frequency portion of the signal energy is coupled into lower frequency power amplifier 42b. Where the higher frequency transducer elements are electrostrictive or more generally high impedance, high voltage elements, no impedance matching transformer is needed between power amplifier 42a and the higher frequency transducer elements. By judicious series and/or parallel connection of the transducer elements of each stack, the output impedance of power amplifier 42a and the impedance of the higher frequency transducer can be closely matched. Furthermore, if barium titanate is utilized for the higher frequency transducer elements, no direct current blocking condenser is necessary since the plate voltage of the power amplifier 42a would provide the polarizing potential for the barium titanate. A coupling transformer 44a is connected between the output of the lower frequency power amplifier 42b and the coil 22 of the vibrator 10.

Figure 2:
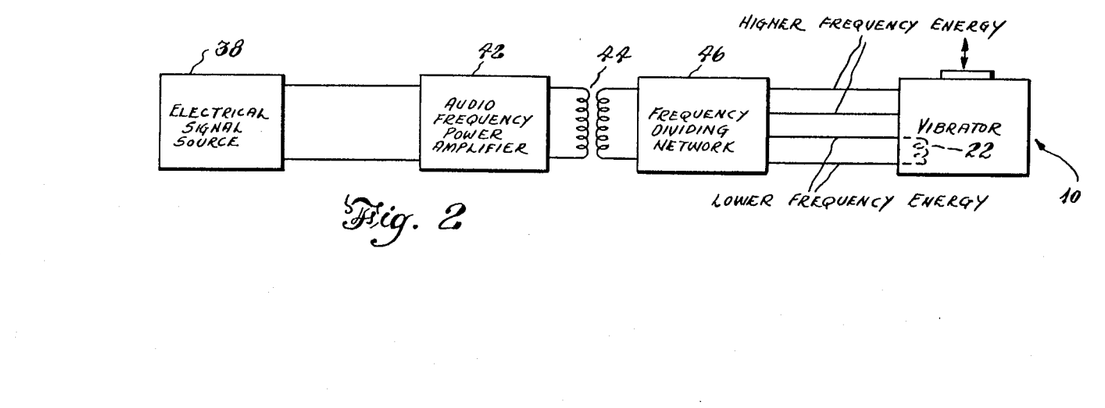
FIG. 2 shows in block form the vibrator of FIG. 1 in combination with power means.

In the modification of FIG. 2, the power amplifier 42 and the coupling transformer 44 will necessarily be difficult to design and expensive since it must handle the frequency range from about 20 cycles to about 20,000 cycles. Also, the frequency dividing network 46 needs to be designed for transferring power to the vibrator 10. In the modification of FIG. 3, the frequency dividing network receives negligible power and is therefore quite inexpensive. Two power amplifiers 42a and 42b are needed. However these two amplifiers are simpler to design and are considerably less costly than the single power amplifier 42. A coupling transformer 44a, simpler and less costly by far than the transformer 44, is needed only for the lower frequency power amplifier 42b, because the impedance of the output stage of the higher frequency power amplifier 42a may be matched directly to the high impedance transducer elements.

Figure 4:
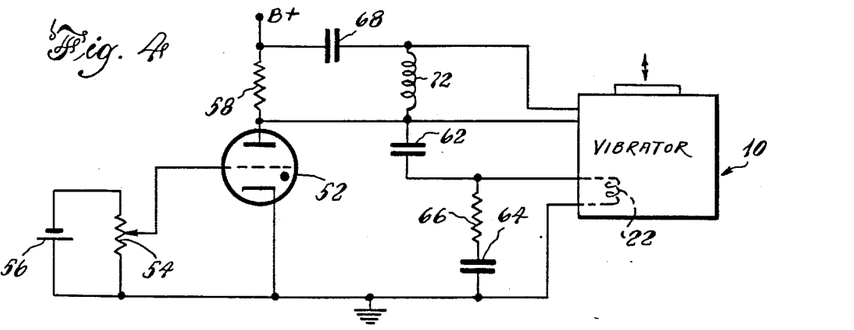
FIG. 4 shows another modification of FIG. 2, the power means being shown schematically.

In FIG. 4, there is shown a relaxation oscillator type of energy source for continually pulsing the vibrator 10 over a selected period of time. It includes a thyratron 52. The control grid of the thyratron 52 is connected to the tap of a potentiometer 54 that is connected across direct voltage source 56 for adjusting the firing potential of the thyratron. A current limiting or loading resistor 58 is connected between the plate of the thyratron and a B+ supply. A condenser 62 is connected to the plate of the thyratron 52. The coil 22 of the vibrator 10 is connected between the other end of condenser 62 and the cathode of the thyratron 52. The coil 22 has comparatively low impedance and has little effect on the operation of the oscillator. Some of the charging current and the discharge current for the condenser 62 passes through the coil 22. A condenser 64 in series with a resistor 66 is connected across the coil 22 and serves as a bypass path for higher frequency energy. The resistor 66 damps any resonance between coil 22 and condenser 64. A condenser 68 and an inductance 72 is connected across the loading resistor 58 and serves as a filter for by-passing the lower frequency components of the voltage developed across the load resistor 58.

Figure 5:
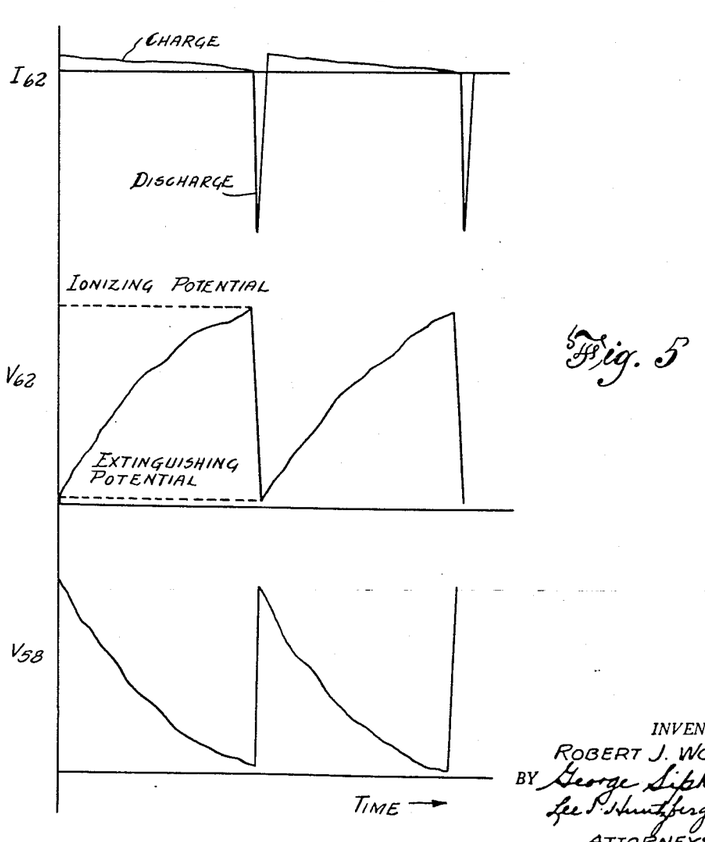
FIG. 5 shows graphically the operation of the power means of FIG. 4.

The operation of the relaxation oscillator circuit is illustrated graphically in FIG. 5. The charging current for condenser 62 flows from the B+ supply through the loading resistor 58, through condenser 62, through the parallel path which includes resistor 66 in series with condenser 64, and the coil 22 and thence to ground which is the negative terminal of the B+ supply. The path for the condenser discharge current includes the condenser 62, the plate-cathode path of thyratron 52, and the parallel path which includes resistor 66 in series with condenser 64, and the coil 22. Most of the low frequency current flowing through the condenser 62 flows through the comparatively low impedance path presented by coil 22. Considered another way, substantially all of the current up to the desired upper-frequency cut-off point of the low frequency elements of the vibrator flows through coil 22, while the higher frequencies are bypassed through the condenser 64. The charging current and the discharge current of condenser 62 is shown graphically at the top of FIG. 5. The loading resistor 58 presents most of the impedance in the charge path and for practical purposes the peak charging current may be approximated as the terminal voltage of the B+ supply divided by the resistance of loading resistor 58. The voltage across condenser 62 is illustrated in the center of FIG. 5; its peak value is equal to the firing potential of the thyratron. The firing potential of the thyratron is changed by changing the grid bias on the thyratron by adjusting the setting of the tap of potentiometer 54. The minimum value of voltage across condenser 62 is equal to the extinguishing potential of the thyratron. The voltage across the loading resistor 58 which is 180° out of phase with the current through the coil 22, is substantially a mirror image of the voltage across condenser 62 since the sum of the voltages is substantially equal to the terminal voltage of the B+ supply; also the filter including the condenser 68 and inductance 72 connected in series across the loading resistor 58 permits only high frequency energy content of the impulses to be transferred to the higher frequency transducer elements of the vibrator 10. That is, the slow fall-off of potential, having essentially no high-frequency components, is blocked by the high impedance of condenser 68, in series with the low impedance (to low frequencies) of inductance 72. Therefore, the signal to the high-frequency transducer elements of vibrator 10 consists simply of repetitive voltage spikes coincident in time with the current spikes through coil 22, but 180° out of phase. To correct the phasing, the connections to coil 22 are reversed. Assuming the repetition rate to be 20 c.p.s., Fourier analysis of such repetitive spikes show a very rich spectrum of energy, with peaks appearing at 20, 40, 60, . . . c.p.s., and, still separated by 20 c.p.s., continuing right through the entire audio-frequency spectrum. All frequency components lower than 1500 c.p.s. will be reproduced by the action of coil 22 in its magnetic field, while frequency components above 1500 c.p.s. will be reproduced by the higher frequency transducer elements of vibrator 10. Any specimen mounted on top of vibrator 10 will experience the linear superposition of both; namely, the sharp spikes shown in FIG. 5. The higher frequency oscillations shown as ripple on the curves of FIGURE 5 result from resonance of coil 22 and condenser 64; the oscillations are small, being damped by resistor 66.

The relaxation oscillator arrangement of FIG. 4 is a convenient and very inexpensive method for driving the vibrator. The energy in the impulses is distributed over a wide frequency range and is useful for simulating generalized mechanical excitation encountered in field conditions. This was discussed in a paper entitled "Impulse vs. Steady State Excitation in the Evaluation of Electron Tubes" at the 23rd National Shock Vibration Symposium in Washington, D.C. in March 1956. No separate pulse initiating means is needed for the oscillator. By adjusting the grid bias of the thyratron and by changing the value of the loading resistor 58 the amplitude of the oscillations and the frequency is varied. The higher frequency and lower frequency components of the energy are divided for transfer to the respective transducer elements of the vibrator as explained above. There is no impedance matching problem since the higher frequency components of the energy originate at high impedance elements and feeds into high impedance transducer elements. The low impedance coil 22 forms part of the path for the lower frequency energy in the oscillator circuit. By using a large enough thyratron adequate power is obtained from the circuit.

Obviously many modifications and variations of the present invention are possible in the light of the above teachings. It is therefore to be understood that within the scope of the appended claims the invention may be practiced otherwise than as specifically described.

I claim:

1. A wide range electromechanical vibrator comprising; electromagnetic transducer means having a direct current coil, an alternating current coil, spring means supporting said alternating coil relative to said direct current coil; and table structure secured to said alternating current coil; at least one stack of barium titanate elements; and means securing the center of said stack of barium titanate elements to said table structure whereby vibration of said table structure and vibration of the portion of said stack of barium titanate elements between the center thereof and the end thereof remote from said table structure are linearly added continuously.

2. A wide range electromechanical vibrator as defined in claim 1 further including means coupling energy occurring in a lower portion of the audio frequency range to said alternating current coil and coupling energy occurring in a frequency range substantially higher than the frequency range of energy coupled into said alternating current coil to said stack of barium titanate elements.

3. A wide range electromechanical vibrator as defined in claim 2 wherein said means coupling energy includes a thyratron, a loading resistor connected to the plate of said thyratron, a B+ supply connected between the other end of said loading resistor and the cathode of said thyratron, a condenser connected at one end to the plate of said thyratron, said alternating current coil being connected between the other end of said condenser and said cathode, a series-connected resistor and condenser connected in shunt across said alternating current coil for shunting high frequency energy, said last-mentioned resistor serving to dampen resonance, a high pass filter connected across said loading resistor and to said stack of barium titanate elements, said loading resistor being of far higher impedance than said alternating current coil, whereby said vibrator is adapted to drive a load with vibrational energy distributed over a wide range which includes substantially the entire audio frequency range.

4. A wide range electromechanical vibrator comprising an electromechanical transducer means having a part movable back and forth in response to variations in the frequency of electrical energy applied thereto and operable over one frequency range, an electrostrictive transducer including at least one stack of barium titanate elements, having a part thereof movable in response to variation in the frequency of electrical energy applied thereto and operable over a frequency range different than the frequency range of said electromechanical transducer, means securing together the movable parts of said transducers and including means engaging said elements centrally to establish a node thereat to preclude transfer of vibration energy from said electrostrictive transducer to said electromechanical transducer whereby the mechanical motions of both are linearly added.

5. A device for subjecting a specimen object to vibratory movements over a wide frequency range, with a displacement which is substantially constant over the entire range of frequencies which comprises a structure, resilient suspension means mounting said structure for vibratory movement, an electrostrictive element supported about midway of its height on said structure and free to vibrate in both directions from its support, having an exposed upper surface on which said specimen object may be supported, means for causing vibratory movement of said structure in one frequency range, means for causing additional vibratory movement of said element in another and higher frequency range, whereby when said object is in contact with said element for vibratory movement therewith, it will partake of the vibrations in both frequency ranges which are added linearly.

6. A device for subjecting a specimen object to vibratory movements over a wide frequency range, which comprises a structure, resilient means mounting said structure for vibratory movements in a selected direction, electrical means for causing such vibratory movements of said structure, an electrostrictive element mounted on said structure for bodily vibration therewith and also for independent vibration thereon in the same selected direction, said element being mounted at a point between its faces in the direction of said vibratory movements to establish a node thereat and limit transfer of vibratory energy from said element to said structure, a thyratron, and circuit means controlled by said thyratron and operable to deliver an activating current in one frequency range to said electrical means that causes vibratory movements of said structure, and another activating current in a higher frequency range than said one frequency range to said electrostrictive element to cause vibratory movements thereof independently of its vibratory movements with said structure, whereby when said specimen object is pressed against said element, it will receive therefrom vibratory impulses from both said structure and said element which are linearly added.

References Cited in the file of this patent

UNITED STATES PATENTS

| | | |
|---|---|---|
| 1,693,806 | Cady | Dec. 4, 1928 |
| 2,101,272 | Scott | Dec. 7, 1937 |
| 2,453,521 | Marquis | Nov. 9, 1948 |
| 2,461,543 | Gunn | Feb. 15, 1949 |
| 2,593,031 | Howatt | Apr. 15, 1952 |
| 2,625,035 | Firestone | Jan. 13, 1953 |
| 2,661,622 | Severs | Dec. 8, 1953 |
| 2,706,400 | Unholz | Apr. 19, 1955 |
| 2,751,512 | Reen et al. | June 19, 1956 |
| 2,776,560 | Erath et al. | Jan. 8, 1957 |
| 2,890,584 | Dickie | June 16, 1959 |